United States Patent
Fischer et al.

(10) Patent No.: US 6,634,490 B2
(45) Date of Patent: Oct. 21, 2003

(54) ROLLER BED FOR A CONVEYOR BELT SYSTEM

(75) Inventors: John S. Fischer, Boulder, CO (US); Edgar Hugh Schwartz, Kersey, CO (US)

(73) Assignee: Air Control Science, Inc., Boulder, CO (US)

( * ) Notice: Subject to any disclaimer, the term of this patent is extended or adjusted under 35 U.S.C. 154(b) by 0 days.

(21) Appl. No.: 09/725,551

(22) Filed: Nov. 29, 2000

(65) Prior Publication Data

US 2002/0063042 A1 May 30, 2002

(51) Int. Cl.[7] .............................................. B65G 15/08
(52) U.S. Cl. ....................... 198/826; 198/820; 198/823; 198/824; 198/825; 198/860.5
(58) Field of Search ................................ 198/826, 825, 198/824, 823, 820, 860.5

(56) References Cited

U.S. PATENT DOCUMENTS

| | | | | |
|---|---|---|---|---|
| 809,227 A | * | 1/1906 | Steckel | 198/826 |
| 1,208,883 A | * | 12/1916 | Zieber | 198/826 |
| 1,530,499 A | * | 3/1925 | Knode | 198/826 |
| 2,427,590 A | * | 9/1947 | Conners | 198/826 |
| 2,818,966 A | | 1/1958 | Gill | |
| 3,089,580 A | * | 5/1963 | Dilgard | 198/826 |
| 3,259,227 A | | 7/1966 | Steinmetz | |
| 3,294,218 A | * | 12/1966 | Chantland | 198/826 |
| 4,885,059 A | * | 12/1989 | Marx, Jr. | 198/826 |
| 5,988,360 A | | 11/1999 | Mott | |
| 6,155,407 A | | 12/2000 | Shelstad | |
| 6,427,828 B1 | | 8/2002 | East et al. | 198/826 |
| 6,543,607 B2 | | 4/2003 | Fischer et al. | 198/826 |

FOREIGN PATENT DOCUMENTS

| | | |
|---|---|---|
| GB | 890160 A | 2/1962 |
| GB | 1 494 960 A | 12/1977 |

OTHER PUBLICATIONS

Unknown, "Attached document was found in an advertisement or Trade Journal. Source Unknown.".

* cited by examiner

*Primary Examiner*—Douglas Hess
(74) *Attorney, Agent, or Firm*—Duft Setter Ollila & Bornsen LLC (57) ABSTRACT

A roller bed that is inserted between idlers in a conveyor belt system. The roller bed includes a base plate that is oriented substantially parallel to said surface of said conveyor belt. A first side plate on a first side of the base plate is oriented at an angle to the surface of the conveyor belt to support a first side of conveyor belt and cause the first side of the conveyor belt to be angled upwards with respect to a plane of the surface. Small diameter rollers, very closely spaced, are affixed to a surface of the first side plate to support the conveyor belt and reduce friction between the side plate and the conveyor belt. A second side plate on a second side of the base plate is oriented at an angle to the surface of the conveyor belt to support a second side of the conveyor belt and cause the second side of the conveyor belt to be angled upwards with respect to the plane of the surface. Rollers that are affixed to a surface of the second plate of the conveyor belt to support the conveyor belt and reduce friction between the side plate and the conveyor belt.

25 Claims, 4 Drawing Sheets

ROLLER BED FOR A CONVEYOR BELT SYSTEM

FIELD OF THE INVENTION

This invention relates to conveyor belt system. More particularly, this invention relates to a bed for supporting a conveyor belt. Still more particularly, this invention relates to a roller bed that is inserted between idlers to support the conveyor with adding as little drag or friction as possible.

PROBLEM

It is common to use conveyor belts to move bulk materials from one place to another. For example, power plants transport coal from storage piles into hoppers in a processing area using a series of conveyor belts. One problem with the use of conveyor belts is spillage of material. A second problem with the use of conveyor belts is air pollution from dust. The access material and dust may be volatile and can be ignited by any heat or spark introduced into the environment.

Spillage of material typically occurs at a transfer point where material is passed from one conveyor belt to a second conveyor belt. The transfer usually occurs by dropping the material from the first conveyor belt to the second belt. As the material hits the second conveyor, the material sprays with some material falling over the edge of the second conveyor belt. Vibrations caused by outside sources, such as motors, may shake the conveyor belt and cause material to fall off the edges remote from the transfer point.

Air pollution is caused by induced air flow in a conveyor belt system. A stream of bulk material is formed by the material falling or being projected from the first conveyor belt to the second conveyor belt. The individual particles in the stream of bulk materials impart a frictional drag on the surrounding air. The surrounding air begins to flow in the direction of the material stream and attains a velocity approaching the velocity of the material stream. This is called an induced airflow. At the end of the fall, the bulk material is suddenly stopped and compacted caused by impact of the material stream onto the second conveyor belt. The velocity pressure of the induced air flow is converted to static pressure by the impact of the bulk material. A region of high air pressure is created by the static pressure. Air in the region of high air pressure must flow to a region of lower air pressure. As the air flows from the region of high air pressure to the region of lower air pressure, small particles of the bulk material are suspended in the air. In an open system, the movement of the air is from high pressure to low pressure is evidenced by a dust cloud billowing from a loading point of the second conveyor belt.

It is common to use a housing to enclose the second conveyor belt and prevent the dust from billowing and reduce spillage. A skirting hangs from the bottom edge of the housing and drags against the side of the conveyor belt to completely enclose the area. To maintain contact with the skirting, a support is added underneath the conveyor belt. Typically, the support includes beams that run longitudinally with the conveyor belt along each side of the conveyor belt, or large rolls spaced apart on 12 to 18 inch centers. In the case of static bars, or beams, it is a problem that these supports cause drag on the conveyor belt. This drag causes undue exertion by a motor turning the conveyor belt, wear of the skirting and wear of the belt. The drag may also generate undesired heat which may melt the belt, or beams. Therefore, an improved manner of maintaining contact with the skirting is needed. In the case of large rolls on 12 plus inch centers, the belt will sag between the rolls and allow spillage, and impingement points where material wedges between the belt and the wearliner, at each point where the belt sags between these rolls.

SOLUTION

The above and other problems are solved and an advance in the arts is made by the provision of a roller bed in accordance with this invention. A first advantage of a roller bed in accordance with this invention is that the roller bed cups the conveyor belt upwards to prevent spillage. A second advantage of this invention is that side plates of the roller bed have rollers that support the conveyor belt. These rollers reduce friction between the roller bed and belt. The rollers are placed with a minimal spacing between rollers to prevent conveyor belt sag which may cause a gap between flexible skirting seals and the conveyor belt. A third advantage of this invention is that the angle of the side plates of the roller bed is adjustable to allow it to be used in conveyor belt systems of different designs manufactured by varying companies.

In accordance with this invention, a roller bed having a plurality of small diameter rollers inserted between idlers of a conveyor system. The roller bed has a base plate oriented substantially parallel to a horizontal surface of the conveyor belt that carries material. A first side plate of the roller bed is coupled to a first side of the base plate and is oriented upwards. It supports a first side of the conveyor belt to cause the side of the conveyor belt to be angled upwards with respect to a horizontal plane of the carrying surface of the conveyor belt. The first side plate has a plurality of rollers that maintain contact with a skirting member and reduce drag caused by a support member.

A second side plate on a second side of the base plate is oriented at an angle to the carrying surface of the conveyor belt and supports a second side of the conveyor belt to cause the second side of the conveyor belt to be angled upwards with respect to the plane of the carrying surface. Rollers affixed to a contact surface of the second plate support the conveyor belt and reduce drag on the conveyor belt.

The base plate may also support horizontal rollers to prevent drag on the conveyor belt.

In order to support conveyor belts having different designs made by competing manufacturers, the first and second side plates may include adjusting brackets and links that permit a change in the angle of orientation of the first and second side plates to conform to the angle created by idlers of the conveyor belt system. The adjusting brackets and links extend upwards from a base, and are coupled to a movable attachment member that supports the first and the second side plates at a desired angle. In a preferred embodiment, the movable attachment member has openings through the support in which a screw is threaded to secure the side plate to the support.

The roller bed may be affixed to the base plate by couplings. The couplings may be a simple screw and threading arrangement.

The rollers mounted on the side plates are mounted with minimal space between the rollers. The rollers may also be smaller in diameter than idlers. The minimal space and smaller diameter reduces that amount of unsupported area underneath the conveyor belt. In a preferred exemplary embodiment, the rollers are of a small diameter and have sealed precision bearing to increase speed and reduce friction.

An aspect of the invention is a roller bed apparatus for supporting a conveyor belt in a material receiving impact zone of a conveyor system; said roller bed apparatus is adapted to be inserted between carry idlers in said conveyor system to reduce conveyor belt sag, said roller bed apparatus comprising:

a base plate oriented substantially parallel to a horizontal surface of a conveyor belt of said conveyor system;

a first side plate coupled to a first end portion of said base plate and oriented at an angle to a horizontal surface of said conveyor belt to support a first side of said conveyor belt and cause said first side of said conveyor belt to be angled upwards with respect to a plane of said horizontal surface;

a first plurality of rollers that are connected to an upper surface of said first side plate;

a second side plate coupled to a second end portion of said base plate and oriented at an angle to said horizontal surface of said conveyor belt to support a second side of said conveyor belt and cause said second side of said conveyor belt to be angled upwards with respect to said plane of said horizontal surface;

a second plurality of rollers that are connected to an upper surface of said second side plate;

adjustment apparatus adapted to adjust said first and said second side plates to control the angle of orientation of said sides of said conveyor belt; and said adjustment apparatus is further adapted to adjust the position of said first and second side plates to accommodate conveyor belts of different widths.

Preferably said conveyor system comprises at least one carry idler positioned beneath said conveyor belt to support a horizontal surface portion of said conveyor belt;

said roller bed apparatus further comprises a third plurality of horizontally oriented rollers connected to said base plate to support said horizontal surface portion of said conveyor belt to reduce conveyor belt sag.

Preferably said adjustment apparatus comprises;

adjusting links connected to said first side plate and to said second side plate to control said angle of orientation of said first and second side plates.

Preferably said adjusting links comprise:

a support link that extends upward from said base plate;

a movable attachment member that affixes said first and said second side plates to said support link at a desired angle of orientation.

Preferably said movable attachment member comprises:

an end portion having a plurality of openings adapted to receive a bolt.

Preferably couplings that connect said base plate to said first side plate and to said second side plate.

Preferably a hood covering an end portion of said conveyor belt;

vertically oriented side walls of said hood extending downwardly towards said sides of said conveyor belt;

the lower portion of said side walls are each affixed to a wear liner and a seal;

said first side plate and said second side plate and said rollers urge said sides of said conveyor belt upwards proximate said wear liner and against said seals to reduce conveyor belt sag and to inhibit the spillage of material from the sides of said conveyor belt under said wear liners and said seals.

Preferably said first plurality of rollers and said second plurality of rollers are: mounted with minimal space between said rollers to reduce conveyor belt sag.

Preferably said first plurality of rollers and said second plurality of rollers are. smaller in diameter than said idlers of said conveyor system to reduce conveyor belt. sag.

Preferably said rollers are mounted with spacing between rollers being less than 12.5% of the diameter of the rollers.

Preferably said rollers are mounted with spacing between rollers being less. than 6% of the diameter of the rollers.

Preferably said rollers are smaller in diameter than said idlers by a factor of less than 1 to 3 to reduce conveyor belt sag.

Preferably said rollers are smaller in diameter than said idlers by a factor of less than 1 to 4 to reduce conveyor belt sag.

Another aspect of the invention is a roller bed apparatus rollers for supporting a conveyor belt in a material receiving impact zone of a conveyor system, said roller bed apparatus is adapted to be inserted between carry idlers of said conveyor system;

said roller bed apparatus comprising:

a base plate oriented substantially parallel to and beneath said conveyor belt, a first side plate coupled to a first end portion of said base plate;

an upper portion of said first side plate having a plurality of rollers inclined at an angle offset from horizontal to support a first side said conveyor belt at said angle, a second side plate coupled to an opposite end portion of said base plate;

an upper portion of said second side plate having a plurality of rollers inclined at an angle offset from horizontal to support a second side of said conveyor belt at said angle;

a hood covering a material receiving end portion of said conveyor belt;

vertically oriented side walls of said hood extend downwardly towards said sides of said conveyor belt;

the lower portion of said side walls are each affixed to a wear liner and a seal;

said rollers of said first side plate and said second side plate urge said first and said second sides of said belt upwards proximate said wear liner and against said seals to reduce conveyor belt sag and to inhibit the spillage of material from the sides of said conveyor belt under said wear liners and said seals;

said rollers are of a diameter sufficiently smaller than the diameter of said. carry idlers and are positioned sufficiently close to each other along the length of said: belt at a spacing that reduces conveyor belt sag and inhibits the spillage of material between the upper edges of said belt and said seal and said wear liners.

Another aspect of the invention is a roller bed apparatus for supporting a. conveyor belt in a material receiving impact zone of a conveyor system, said roller bed apparatus is adapted to be inserted between carry idlers of said conveyor system to reduce conveyor belt sag;

said roller bed apparatus comprising:

a base plate oriented substantially parallel to and beneath said conveyor belt;

a first side plate coupled to a first end portion of said base plate;

an upper portion of said first side plate having a plurality of rollers inclined at an angle offset from horizontal to said to support a first side said conveyor belt at said angle;

a second side plate coupled to an opposite end portion of said base plate;

an upper portion of said second side plate having a plurality of rollers inclined at an angle offset from horizontal to support a second side of said conveyor belt at said angle;

adjustment apparatus for adjusting said first side plate and said second side plate to an angle of inclination matching that of the inclined sides of said conveyor belt;

at least one idler coupled to said support rail beneath said conveyor belt to support a lower horizontal surface of said conveyor belt; and said apparatus for adjusting comprises adjusting means coupled to said first side plate and to said second side plate to adjust the position of said first and second side plates to different angles of inclination and to accommodate conveyor belts of different widths and to reduce conveyor belt sag.

Another aspect of the invention is a roller bed apparatus for supporting a conveyor belt in a material receiving impact zone of a conveyor system, said roller bed apparatus is adapted to be inserted between carry idlers of said conveyor system positioned along the length of said conveyor belt to reduce conveyor belt sag, said conveyor belt, said conveyor system further includes a hood having sidewalls covering at least a portion of said conveyor belt, said sidewalls each have a wear liner and a seal affixed to the bottom portion of said sidewalls to inhibit spillage of material between the edges of said conveyor belt and said wear liner and said seals;

said roller bed apparatus comprising:

a base plate oriented substantially perpendicular to the longitudinal axis of said conveyor belt and positioned beneath said conveyor belt;

a first side plate coupled to a first end portion of said base plate;

an upper portion of said first side plate having a plurality of rollers inclined at an angle offset from horizontal to support a first side said conveyor belt at said angle;

a second side plate coupled to an opposite end portion of said base plate;

an upper portion of said second side plate having a plurality of rollers inclined at an angle offset from horizontal to support a second side of said conveyor belt at said angle;

said rollers urge said first and said second inclined sides of said conveyor belt upwards proximate said wear liners and against said seals;

said plurality of rollers are of a diameter sufficiently smaller than the diameter of said carry idlers and are positioned sufficiently close to each other along the length of said belt at a spacing that reduces conveyor belt sag and inhibits the spillage of material between the upper edges of said belt and said seal of said side walls of said hood.

Preferably said rollers are mounted with spacing between rollers being less than 12.5% of the diameter of the rollers.

Preferably said rollers are mounted with spacing between rollers being less than 6% of the diameter of the rollers.

Preferably said rollers are smaller in diameter than said idlers by a factor of less than 1 to 3.

Preferably said rollers are smaller in diameter than said idlers by a factor of less than 1 to 4.

Figure 1:
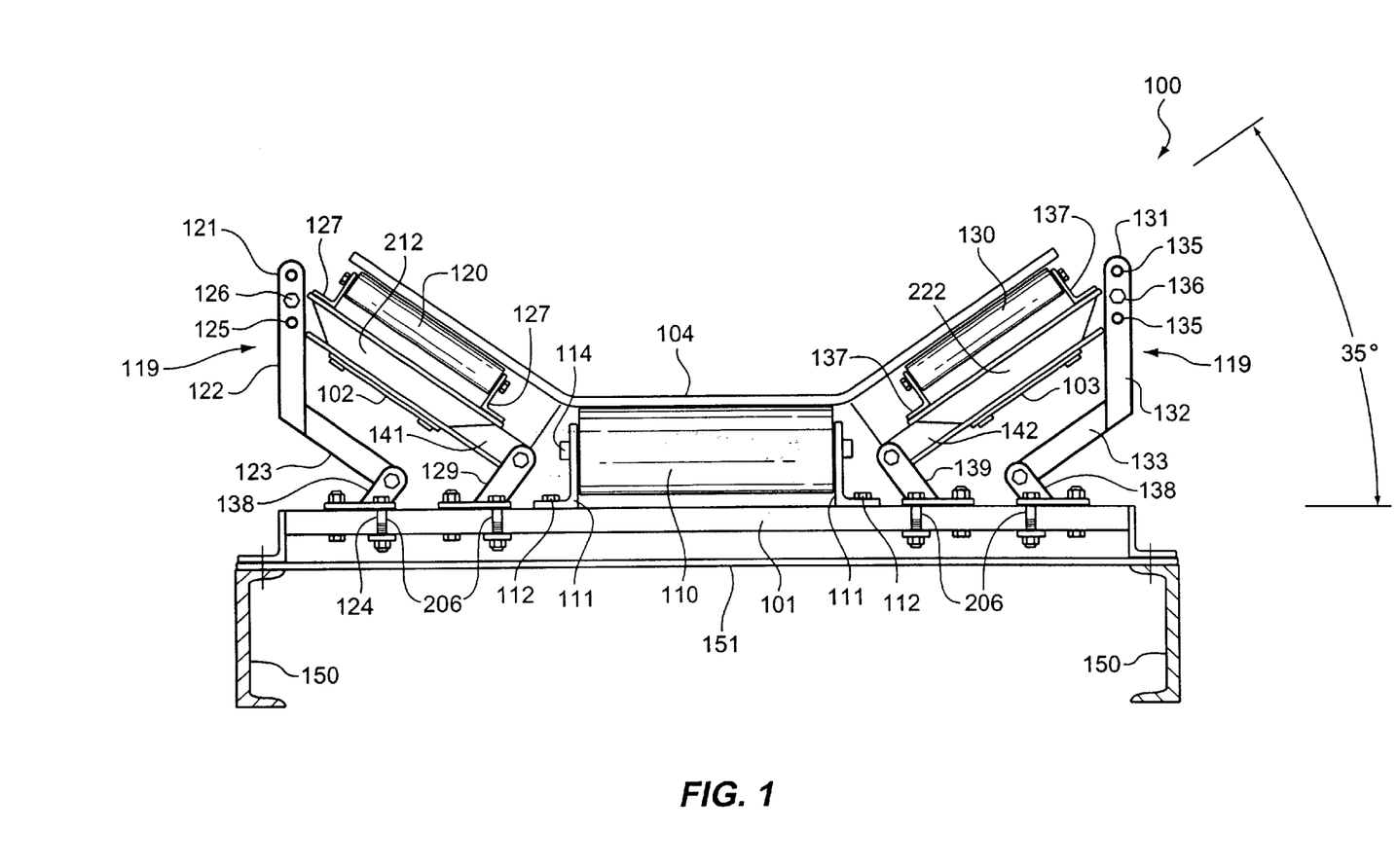
FIG. 1 illustrating a front view of a roller bed in accordance with this invention.

Base plate 101 is a platform which holds a carrying horizontal surface of conveyor belt 104 flat. Base plate 101 provides an impact plate that prevents conveyor belt 104 from buckling under the impact of material. Base plate 101 has an upper support surface oriented substantially parallel to the horizontal carrying surface of conveyor belt 104. In the embodiment shown, a surface of base plate 101 is connected to elements that support conveyor belt 104 via horizontal rollers 110. Horizontal rollers 110 are affixed to base plate 101 via struts 111. Struts 111 are affixed to base plate 101 by bolts 112 that thread through openings in base plate 101 and struts 111. Rollers 110 are affixed to struts 111 by pins 114. Element 151 is a support plate connecting the left and right side elements 150.

First side plate 102 is connected to a left end portion of base plate 101 via links 129 and is oriented at an angle to the carrying surface of the conveyor belt. First side plate 101 and rollers 120 support a first side of conveyor belt 104 and causes the first side of the conveyor belt to be angled upwards with respect to a horizontal surface of the conveyor belt. First side plate 102 supports rollers 120 via brackets 127. Rollers 120 reduce drag and allow conveyor belt 104 to move along with less friction.

In the shown embodiment, rollers 120 are affixed to side plate 102 which slideably engages rail 141. Rail 141 is connected to base plate 101 via link 129. Other manners of affixing rollers 120 to side plate 102 are possible as well as are other manners of affixing rail 141 to base plate 101. Guide 212 slides on rail 141.

Rail 141 is held in position by links 129,122 and 123. Links 129,122 and 123 are affixed to base plate 101 on a first end and to rail 141 on a second end. In the shown embodiment, links 129, 122 and 123 are affixed to base plate 101 by brackets 138 and 139. However, any other fastening devices may be used. Links 129, 122 and. 123 are affixed to base plate 101 by bolts 124 threaded through openings in brackets.

In order to be usable with different designs of conveyor belts, first side plate. 102 is connected to movable attachment link member 129. Movable attachment link member 129 allows the inclination of first side plate 102 is set to be changed. In this embodiment, the inclination of side plate 102 is controlled by the plurality of threaded mated openings 125 on the movable link 122 through which a bolt 126 is inserted. However, one skilled in the art will recognize that other adjustable members may be used, such as a pin.

Second side plate 103 is comparable to first side plate 102 and is connected to the right end of base plate 101 via link 139 and is inclined at an angle from the carrying surface of the conveyor belt 104. Second side plate 101 supports a second side of conveyor belt 104 and causes it to be angled upwards with respect to the horizontal plane of the carrying surface of the conveyor belt. Second side plate 103 supports rollers 130 similar to roller 120. Rollers 130 provide a support surface for the second side of belt 104. The rollers 130 reduce drag and allow conveyor belt 104 to move along with less friction.

In the shown embodiment, rollers 130 are affixed to rail 142 by side plate 103 which slideably engages rail 142. Rail 142 is connected to base plate 101 via link 139. One skilled in the art will appreciate that other manners of affixing rollers 130 to side plate 103 are possible as well as other manners of affixing rail 142 to base plate 101. Guide 132 slides on rail 142.

Side plate 103 and rail 142 are held in position by links 132 and 133. Links 132 and 133 are affixed to base plate 101 by a first end and to rail 141 by a second end. Links 132 and 133 are affixed to base plate 101 by clamps. However, any other fastening device may be used. Links 122 and 123 are affixed to base plate 101 by bolts 136 threaded through openings. Although those skilled in the art will recognize that any other form of fastener may be used.

In order to be usable with different designs of conveyor belts, second side plate 103 has a movable attachment link member 139 which allows the angle at which second side plate 102 is set to be changed to fit under the desired belt. Link 132 has a plurality of threaded mated openings 135 through which a bolt 136 is inserted to alter the inclination of rollers 130.

Figure 2:
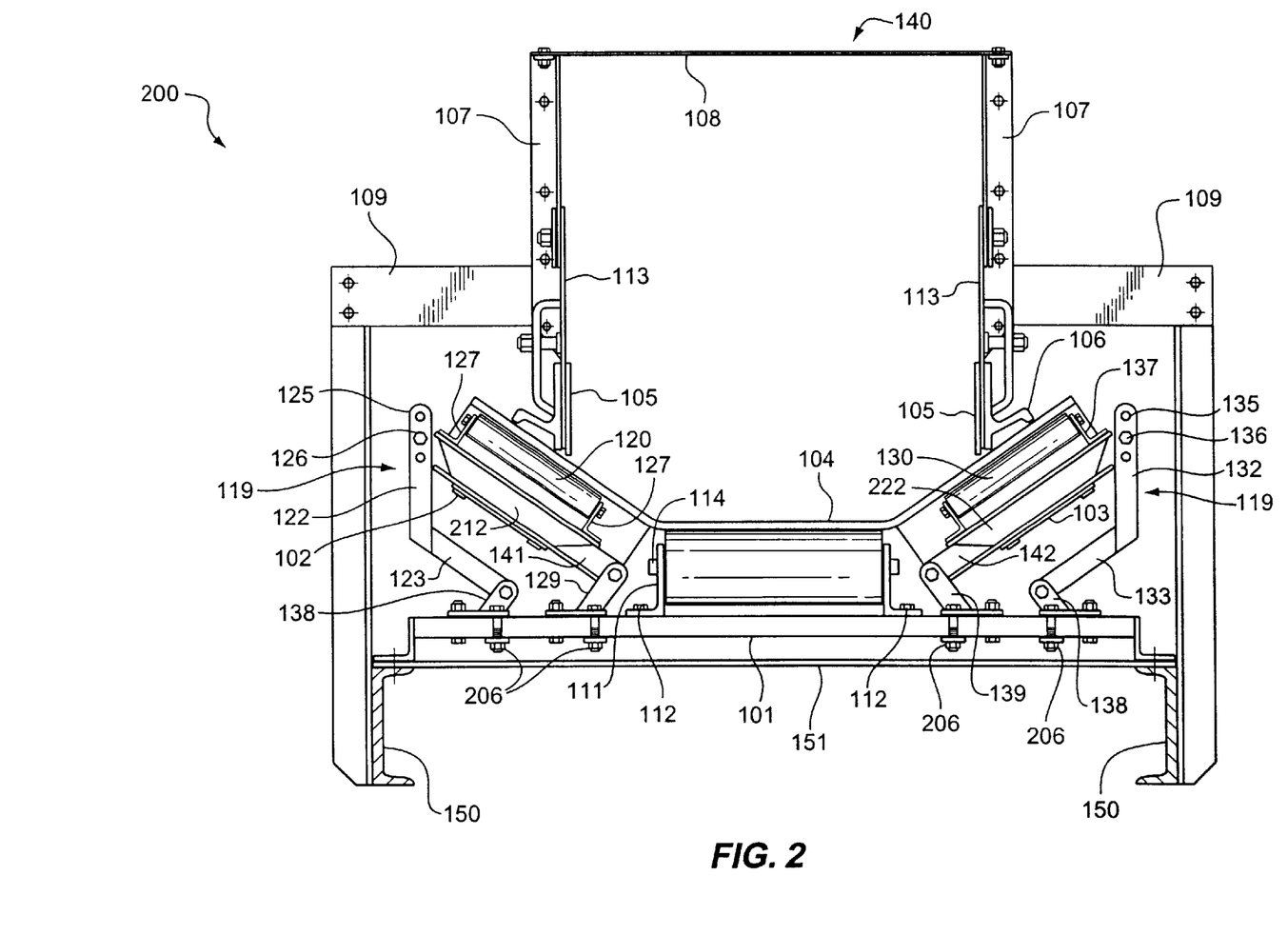
FIG. 2 illustrating a front view of a roller bed inserted into a conveyor belt system in accordance with this invention.

FIG. 2 illustrates cross sectional front view of conveyor system 200 including roller bed 100 of FIG. 1. Conveyor system 200 includes hood 140 having side walls 113 and elements 107 and covering 108. Side walls 113 and covering 108 enclose conveyor belt 104. Supports 107 affix hood 140 to the base of conveyor belt system. 200. Conveyor stringers 150 affix roller bed apparatus 119 to a base of conveyor system 100.

Wear liners 105 are affixed to a bottom end of skirt boards 107. Wear liners 105 brush against conveyor belt 104 to prevent material from spilling out of the enclosing over the side of belt 104. Skirting seals 106 extend outward and further enclose conveyor belt 104 to prevent material side spill.

Figure 3:
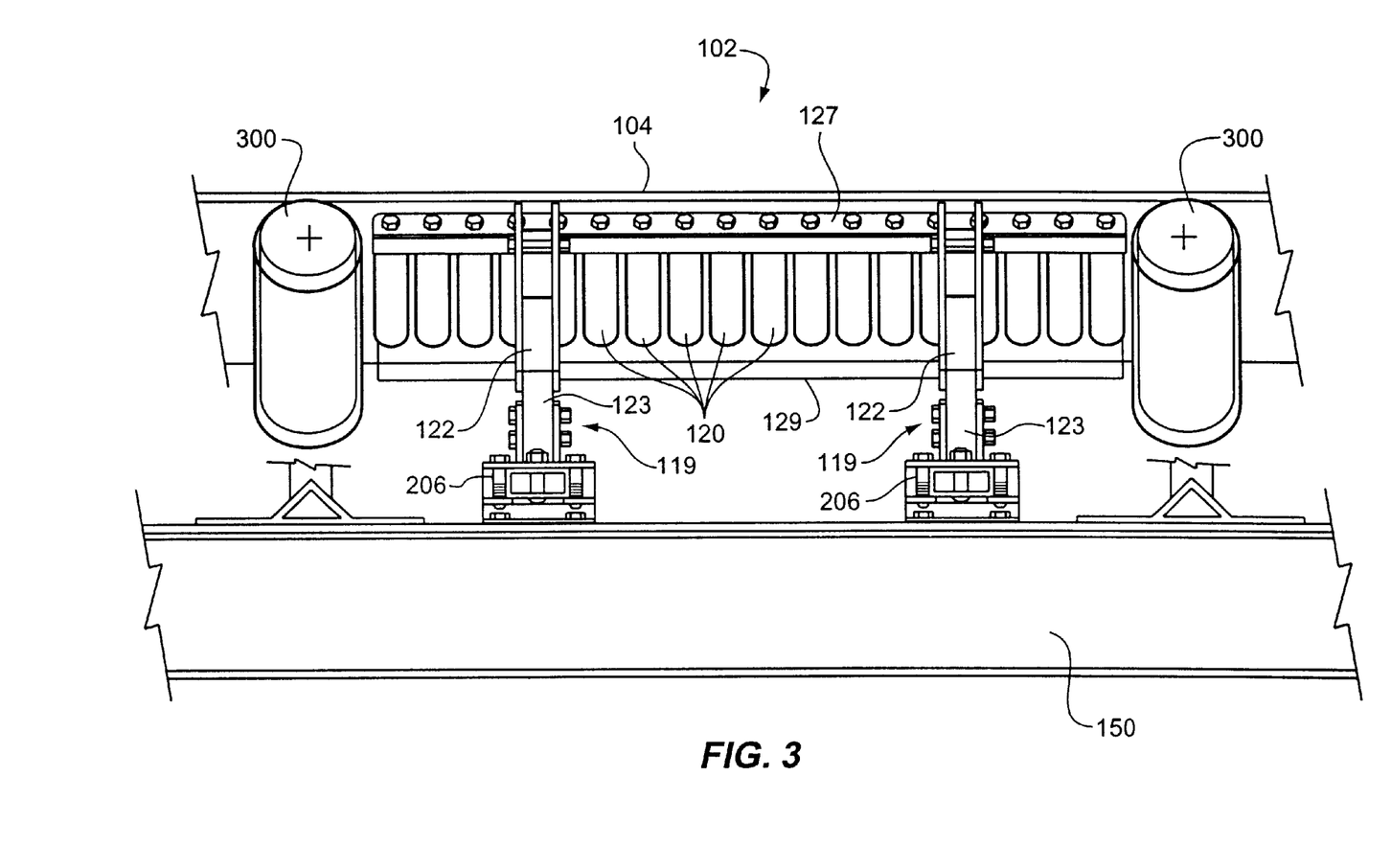
FIG. 3 illustrating a side view of a side plate of a roller bed in accordance with this invention.

FIG. 3 illustrates a side view of a first side plate 102 to further show the configuration of first side plate 102 and second side plate 103. First side plate 102 is positioned between existing idlers 300 of the conveyor system. Rails 127 affix to link member 122 on an upper side and to link element 129 on a lower side. The upper side is the side of side plate 102 is at the edge of conveyor belt 104 and its lower side is proximate the center of conveyor belt 104. FIG. 3 shows the inclination of side plate 102. FIG. 3 also shows that rollers 120 have a smaller diameter than idlers 300. This allows rollers 120 to be placed close together to minimize belt sag. The result is complete and even support between idlers 300.

In a preferred embodiment, the rollers 120 are of a smaller diameter than idlers 300 and have sealed precision bearings. This promotes a much better sealing foundation for the bed to prevent spillage.

Figure 4:
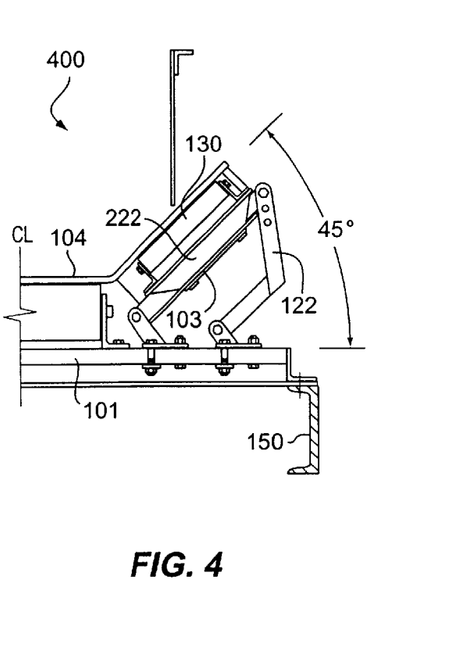
FIG. 4 illustrating a front view of a side plate at a first angle.
Figure 5:
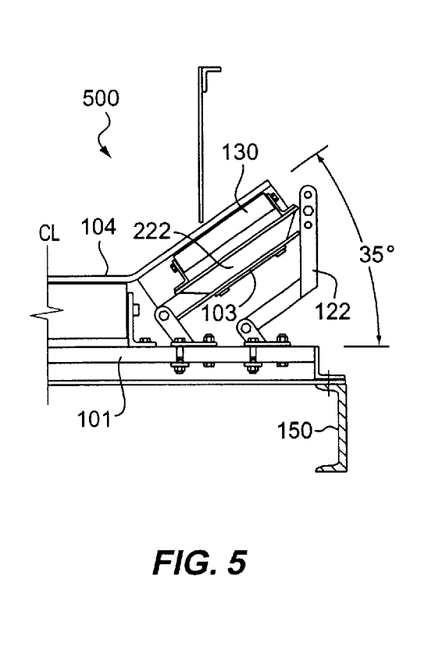
FIG. 5 illustrating a front view of a side plate at a second angle.
Figure 6:
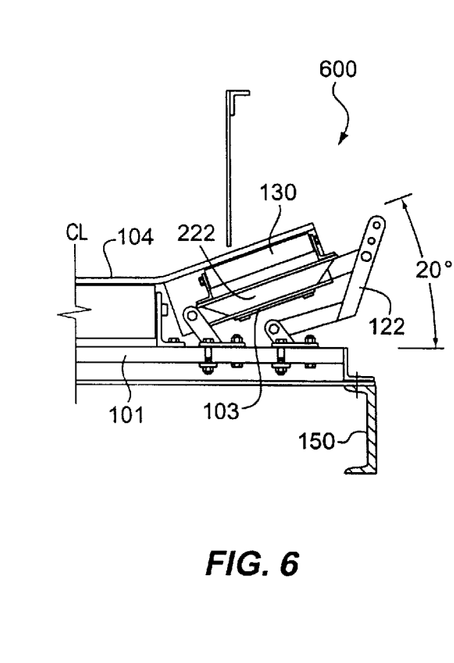
FIG. 6 illustrating a front view of a side plate at a third angle.

FIGS. 4,5, and 6 illustrate first side plate 102 at a variety of angles to fit under different conveyor belts. In FIG. 4, first side plate 102 is in position 400 at a 45 degree angle with respect to the plane of the carrying surface of the conveyor belt 104. In the shown embodiment, first side plate 102 is placed in position 400 by inserting as bolt through a top most opening in movable attachment member 122. In FIG. 5, first side plate 102 is in position 500 which is at a 35 degree angle with respect to the plane of the carrying surface of conveyor belt 104. In the shown embodiment, first side plate 102 is placed in position 500 by inserting as bolt through a middle opening in movable attachment member 122. In FIG. 6, first side plate 102 is in position 600 at a 20 degree angle with respect to the plane of the carrying surface of conveyor belt 104. In the shown embodiment, first side plate 102 is placed in position 600 by inserting as bolt through a top most opening in movable attachment member 122.

The above is a description of a roller bed that is inserted between idlers in a conveyor in accordance with this invention. It is possible that those skilled in the art will design alternative roller beds that infringe this roller bed as set forth in the claim below either literally or through the Doctrine of Equivalents.

What is claimed is:

1. Roller bed apparatus for supporting a conveyor belt in a material receiving impact zone of a conveyor system; said roller bed apparatus is adapted to be inserted between carry idlers in said conveyor system to reduce conveyor belt sag, said roller bed apparatus comprising:

a base plate oriented substantially parallel to a horizontal surface of a conveyor belt of said conveyor system;

a first side plate coupled to a first end portion of said base plate and oriented at an angle to a horizontal surface of said conveyor belt to support a first side of said conveyor belt and cause said first side of said conveyor belt to be angled upwards with respect to a plane of said horizontal surface;

a first plurality of rollers that are connected to an upper surface of said first side plate;

a second side plate coupled to a second end portion of said base plate and oriented at an angle to said horizontal surface of said conveyor belt to support a second side of said conveyor belt and cause said second side of said conveyor belt to be angled upwards with respect to said plane of said horizontal surface;

a second plurality of rollers that are connected to an upper surface of said second side plate;

adjustment apparatus adapted to adjust said first and said second side plates to control the angle of orientation of said sides of said conveyor belt; and said adjustment apparatus is further adapted to adjust the position of said first and second side plates to accommodate conveyor belts of different widths.

2. The roller bed of claim 1 characterized in that:

said conveyor system comprises at least one carry idler positioned beneath said conveyor belt to support a horizontal surface portion of said conveyor belt;

said roller bed apparatus further comprises a third plurality of horizontally oriented rollers connected to said base plate to support said horizontal surface portion of said conveyor belt to reduce conveyor belt sag.

3. The roller bed apparatus of claim 1 characterized in that said adjustment apparatus comprises;

adjusting links connected to said first side plate and to said second side plate to control said angle of orientation of said first and second side plates.

4. The roller bed apparatus of claim 3 wherein said adjusting links comprise:

a support link that extends upward from said base plate;

a movable attachment member that affixes said first and said second side plates to said support link at a desired angle of orientation.

5. The roller bed apparatus of claim 4 wherein said movable attachment member comprises:

an end portion having a plurality of openings adapted to receive a bolt.

6. The roller bed apparatus of claim 1 further comprising:

couplings that connect said base plate to said first side plate and to said second side plate.

7. The conveyor system of claim 1 further having:

a hood covering an end portion of said conveyor belt;

vertically oriented side walls of said hood extending downwardly towards said sides of said conveyor belt;

the lower portion of said side walls are each affixed to a wear liner and a seal;

said first side plate and said second side plate and said rollers urge said sides of said conveyor belt upwards proximate said wear liner and against said seals to reduce conveyor belt sag and to inhibit the spillage of material from the sides of said conveyor belt under said wear liners and said seals.

8. The roller bed apparatus of claim 1 wherein said first plurality of rollers and said second plurality of rollers are mounted with minimal space between said rollers to reduce conveyor belt sag.

9. The roller bed apparatus of claim 1 wherein rollers in said first plurality of rollers and said second plurality of rollers are smaller in diameter than said idlers of said conveyor system to reduce conveyor belt sag.

10. The roller bed apparatus of claim 1 characterized in that said rollers are mounted with spacing between rollers being less than 12.5% of the diameter of the rollers.

11. The roller bed apparatus of claim 1 characterized in that said rollers are mounted with spacing between rollers being less than 6% of the diameter of the rollers.

12. The roller bed apparatus of claim 1 characterized in that said rollers are smaller in diameter than said idlers by a factor of less than 1 to 3 to reduce conveyor belt sag.

13. The roller bed apparatus of claim 1 characterized in that said rollers are smaller in diameter than said idlers by a factor of less than 1 to 4 to reduce conveyor belt sag.

14. Roller bed apparatus for supporting a conveyor belt in a material receiving impact zone of a conveyor system, said roller bed apparatus is adapted to be inserted between carry idlers of said conveyor system to reduce conveyor belt sag; said roller bed apparatus comprising:

a base plate oriented substantially parallel to and beneath said conveyor belt;

a first side plate coupled to a first end portion of said base plate;

an upper portion of said first side plate having a plurality of rollers inclined at an angle offset from horizontal to said to support a first side said conveyor belt at said angle;

a second side plate coupled to an opposite end portion of said base plate;

an upper portion of said second side plate having a plurality of rollers inclined at an angle offset from horizontal to support a second side of said conveyor belt at said angle;

a hood covering a material receiving end portion of said conveyor belt;

vertically oriented side walls of said hood extend downwardly towards said: sides of said conveyor belt;

the lower portion of said side walls are each affixed to a wear liner and a seal;

said rollers of said first side plate and said second side plate urge said first and said second sides of said belt upwards proximate said wear liner and against said seals to reduce conveyor belt sag and to inhibit the spillage of material from the sides of said conveyor belt under said wear liners and said seals;

said rollers are of a diameter sufficiently smaller than the diameter of said carry idlers and are positioned sufficiently close to each other along the length of said belt at a spacing that reduces conveyor belt sag and inhibits the spillage of material between the upper edges of said belt and said seal and said wear liners.

15. Roller bed apparatus for supporting a conveyor belt in a material receiving impact zone of a conveyor system, said roller bed apparatus is adapted to be inserted between carry idlers of said conveyor system to reduce conveyor belt sag; said roller bed apparatus comprising:

a base plate oriented substantially parallel to and beneath said conveyor belt;

a first side plate coupled to a first end portion of said base plate;

an upper portion of said first side plate having a plurality of rollers inclined at an angle offset from horizontal to said to support a first side said conveyor belt at said angle;

a second side plate coupled to an opposite end portion of said base plate;

an upper portion of said second side plate having a plurality of rollers inclined at an angle offset from horizontal to support a second side of said conveyor belt at said angle;

adjustment apparatus for adjusting said first side plate and said second side plate to an angle of inclination matching that of the inclined sides of said conveyor belt;

at least one idler coupled to said support rail beneath said conveyor belt to support a lower horizontal surface of said conveyor belt; and said apparatus for adjusting comprises adjusting means coupled to said first side plate and to said second side plate to adjust the position of said first and second side plates to different angles of inclination and to accommodate conveyor belts of different widths and to reduce conveyor belt sag.

16. Roller bed apparatus for supporting a conveyor belt in a material receiving impact zone of a conveyor system, said roller bed apparatus is adapted to be inserted between carry idlers of said conveyor system positioned along the length of said conveyor belt to reduce conveyor belt sag, said conveyor system further includes a hood having sidewalls covering at least a portion of said conveyor belt, said sidewalls each have a wear liner and a seal affixed to the bottom portion of said sidewalls to inhibit spillage of material between the edges of said conveyor belt and said wear liner and said seals;

said roller bed apparatus comprising:

a base plate oriented substantially perpendicular to the longitudinal axis of said conveyor belt and positioned beneath said conveyor belt;

a first side plate coupled to a first end portion of said base plate;

an upper portion of said first side plate having a plurality of rollers inclined at an angle; offset from horizontal to support a first side said conveyor belt at said angle;

a second side plate coupled to an opposite end portion of said base plate;

an upper portion of said second side plate having a plurality of rollers inclined at an angle offset from horizontal to support a second side of said conveyor belt at said angle;

said rollers urge said first and said second inclined sides of said conveyor belt upwards proximate said wear liners and against said seals;

said plurality of rollers are of a diameter sufficiently smaller than the diameter of said carry idlers and are positioned sufficiently close to each other along the length of said belt at a spacing that reduces conveyor belt sag and inhibits the spillage of material between the upper edges of said belt and said seal of said side walls of said hood.

17. The roller bed apparatus of claim 16 characterized in that said rollers are mounted with spacing between rollers being less than 12.5% of the diameter of the rollers.

18. The roller bed apparatus of claim 16 characterized in that said rollers are mounted with spacing between rollers being less than 6% of the diameter of the rollers.

19. The roller bed apparatus of claim 16 characterized in that said rollers are smaller in diameter than said idlers by a factor of less than 1 to 3.

20. The roller bed apparatus of claim 16 characterized in that said rollers are smaller in diameter than said idlers by a factor of less than 1 to 4.

21. Roller bed apparatus for supporting a conveyor belt in a material receiving impact zone of a conveyor system, said roller bed apparatus is adapted to be inserted between carry idlers of said conveyor system to reduce conveyor belt sag;

said roller bed apparatus comprising:

a base plate oriented substantially parallel to and beneath said conveyor belt;

a first side plate coupled to a first end portion of said base plate;

an upper portion of said first side plate having a plurality of rollers inclined at an angle offset from horizontal to support a first side said conveyor belt at said angle;

a second side plate coupled to an opposite end portion of said base plate;

an upper portion of said second side plate having a plurality of rollers inclined at an angle offset from horizontal to support a second side of said conveyor belt at said angle;

said rollers of said first side plate and said second side plate urge said first and said second sides of said belt upwards to reduce conveyor belt sag and to inhibit the spillage of material from the sides of said conveyor belt;

said rollers are of a diameter sufficiently smaller than the diameter of said carry idlers and are positioned sufficiently close to each other along the length of said belt at a spacing that reduces conveyor belt sag and inhibits the spillage of material from the sides of said conveyor belt.

22. The roller bed apparatus of claim 21 characterized in that said rollers are mounted with spacing between rollers being less than 12.5% of the diameter of the rollers.

23. The roller bed apparatus of claim 21 characterized in that said rollers are mounted with spacing between rollers being less than 6% of the diameter of the rollers.

24. The roller bed apparatus of claim 21 characterized in that said rollers are smaller in diameter than said idlers by a factor of less than 1 to 3.

25. The roller bed apparatus of claim 21 characterized in that said rollers are smaller in diameter than said idlers by a factor of less than 1 to 4.

* * * * *

UNITED STATES PATENT AND TRADEMARK OFFICE
CERTIFICATE OF CORRECTION

PATENT NO. : 6,634,490 B2
DATED : October 21, 2003
INVENTOR(S) : Fischer et al.

It is certified that error appears in the above-identified patent and that said Letters Patent is hereby corrected as shown below:

<u>Column 5,</u>
Line 65, please insert the following:

-- Another aspect is a roller bed apparatus for supporting a conveyor belt in a material receiving impact zone of a conveyor system, said roller bed apparatus is adapted to be inserted between carry idlers of said conveyor system to reduce conveyor belt sag;

said roller bed apparatus comprising:

a base plate oriented substantially parallel to and beneath said conveyor belt;

a first side plate coupled to a first end portion of said base plate;

an upper portion of said first side plate having a plurality of rollers inclined at an angle offset from horizontal to support a first side said conveyor belt at said angle;

a second side plate coupled to an opposite end portion of said base plate;

an upper portion of said second side plate having a plurality of rollers inclined at an angle offset from horizontal to support a second side of said conveyor belt at said angle;

said rollers of said first side plate and said second side plate urge said first and said second sides of said belt upwards to reduce conveyor belt sag and to inhibit the spillage of material from the sides of said conveyor belt;

said rollers are of a diameter sufficiently smaller than the diameter of said carry idlers and are positioned sufficiently close to each other along the length of said belt at a spacing that reduces conveyor belt sag and inhibits the spillage of material from the sides of said conveyor belt.

Preferably said rollers are mounted with spacing between rollers being less than 12.5% of the diameter of the rollers.

Preferably said rollers are mounted with spacing between rollers being less than 6% of the diameter of the rollers.

Preferably said rollers are smaller in diameter than said idlers by a factor of less than 1 to 3.

Preferably said rollers are smaller in diameter than said idlers by a factor of less than 1 to 4.

UNITED STATES PATENT AND TRADEMARK OFFICE
CERTIFICATE OF CORRECTION

PATENT NO. : 6,634,490 B2
DATED : October 21, 2003
INVENTOR(S) : Fischer et al.

It is certified that error appears in the above-identified patent and that said Letters Patent is hereby corrected as shown below:

Column 5, (cont.)
Detailed Description

In accordance with this invention, a roller bed is designed to support a conveyor belt between idlers. This roller bed is inserted between idlers that support a conveyor belt. The roller bed cups the conveyor belt between idlers to prevent spillage and presses the conveyor belt against skirting to prevent spillage and dust.

FIG. 1 illustrates a front view of a roller bed 100 supporting conveyor belt 104. Roller bed 100 has base plate 101, first side plate 102 and second side plate 103. Base plate 101 supports a bottom carrying surface of conveyor belt 104. First side plate 102 angles a first side of conveyor belt 104 to cup conveyor belt 104 to prevent spillage and holds conveyor belt 104 against a skirt. Second side plate 103 angles a second side of conveyor belt 104 to cup conveyor belt 104 to prevent spillage and holds conveyor belt 104 against a skirt. --

Column 6,
Lines 28 and 29, replace "129,122" with -- 129, 122 --

Signed and Sealed this

Eighteenth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,634,490 B2
DATED : October 21, 2003
INVENTOR(S) : Fischer et al.

It is certified that error appears in the above-identified patent and that said Letters Patent is hereby corrected as shown below:

<u>Column 5,</u>
Line 65, please insert the following:
-- Another aspect is a roller bed apparatus for supporting a conveyor belt in a material receiving impact zone of a conveyor system, said roller bed apparatus is adapted to be inserted between carry idlers of said conveyor system to reduce conveyor belt sag;
  said roller bed apparatus comprising:
  a base plate oriented substantially parallel to and beneath said conveyor belt;
  a first side plate coupled to a first end portion of said base plate;
  an upper portion of said first side plate having a plurality of rollers inclined at an angle offset from horizontal to support a first side said conveyor belt at said angle;
  a second side plate coupled to an opposite end portion of said base plate;
  an upper portion of said second side plate having a plurality of rollers inclined at an angle offset from horizontal to support a second side of said conveyor belt at said angle;
  said rollers of said first side plate and said second side plate urge said first and said second sides of said belt upwards to reduce conveyor belt sag and to inhibit the spillage of material from the sides of said conveyor belt;
  said rollers are of a diameter sufficiently smaller than the diameter of said carry idlers and are positioned sufficiently close to each other along the length of said belt at a spacing that reduces conveyor belt sag and inhibits the spillage of material from the sides of said conveyor belt.
  Preferably said rollers are mounted with spacing between rollers being less than 12.5% of the diameter of the rollers.

Preferably said rollers are mounted with spacing between rollers being less than 6% of the diameter of the rollers.

Preferably said rollers are smaller in diameter than said idlers by a factor of less than 1 to 3.

Preferably said rollers are smaller in diameter than said idlers by a factor of less than 1 to 4.

UNITED STATES PATENT AND TRADEMARK OFFICE
CERTIFICATE OF CORRECTION

PATENT NO. : 6,634,490 B2
DATED : October 21, 2003
INVENTOR(S) : Fischer et al.

It is certified that error appears in the above-identified patent and that said Letters Patent is hereby corrected as shown below:

Column 5, (cont.)

Description of the Drawings

The above and other features of this invention are described in the detailed description given below and the following drawings.

Detailed Description

In accordance with this invention, a roller bed is designed to support a conveyor belt between idlers. This roller bed is inserted between idlers that support a conveyor belt. The roller bed cups the conveyor belt between idlers to prevent spillage and presses the conveyor belt against skirting to prevent spillage and dust.

FIG. 1 illustrates a front view of a roller bed 100 supporting conveyor belt 104. Roller bed 100 has base plate 101, first side plate 102 and second side plate 103. Base plate 101 supports a bottom carrying surface of conveyor belt 104. First side plate 102 angles a first side of conveyor belt 104 to cup conveyor belt 104 to prevent spillage and holds conveyor belt 104 against a skirt. Second side plate 103 angles a second side of conveyor belt 104 to cup conveyor belt 104 to prevent spillage and holds conveyor belt 104 against a skirt. --

UNITED STATES PATENT AND TRADEMARK OFFICE
CERTIFICATE OF CORRECTION

PATENT NO. : 6,634,490 B2
DATED : October 21, 2003
INVENTOR(S) : Fischer et al.

It is certified that error appears in the above-identified patent and that said Letters Patent is hereby corrected as shown below:

<u>Column 6,</u>
Lines 28 and 29, replace "129,122" with -- 129, 122 --

This certificate supersedes Certificate of Correction issued January 18, 2005.

Signed and Sealed this

Nineteenth Day of July, 2005

JON W. DUDAS
*Director of the United States Patent and Trademark Office*